United States Patent [19]

Imai et al.

[11] 4,252,424
[45] Feb. 24, 1981

[54] FOCUSING OPTICAL SYSTEM FOR SINGLE-LENS REFLEX CAMERAS

[75] Inventors: Toshihiro Imai; Yoshisada Hayamizu, both of Hachiouji, Japan

[73] Assignee: Olympus Optical Co., Ltd., Tokyo, Japan

[21] Appl. No.: 8,689

[22] Filed: Jan. 30, 1979

[30] Foreign Application Priority Data

Feb. 10, 1978 [JP] Japan ................... 53-13607

[51] Int. Cl.³ .......................... G03B 7/08; G03B 3/00; G03B 19/12
[52] U.S. Cl. ................................. 354/23 R; 354/152; 354/195
[58] Field of Search ................... 354/23 R, 23 D, 152, 354/154, 195, 25, 153, 155-158

[56] References Cited

U.S. PATENT DOCUMENTS 3,779,146  12/1973  Trankner ...................... 354/23 R

FOREIGN PATENT DOCUMENTS 2031155  1/1972  Fed. Rep. of Germany ........ 354/23 R Primary Examiner—L. T. Hix
Assistant Examiner—Thomas H. Tarcza
Attorney, Agent, or Firm—Cushman, Darby & Cushman

[57] ABSTRACT

A focusing optical system for single-lens reflex cameras comprising a quick return mirror having a section of incidence formed by removing a portion of the surface of said mirror and an emerging section, and a detector element which is arranged in the vicinity of said section of incidence. Said focusing optical system is adapted in such a manner that a portion of the light emitted from an object to be photographed is allowed to pass through said section of incidence into the inside of said quick return mirror, reflect on the inner surfaces of said quick return mirror, emerge from said emerging section and then is detected with said detector element, thereby permitting accurate detection without hindering observation through a finder of single-lens reflex cameras.

9 Claims, 7 Drawing Figures

FOCUSING OPTICAL SYSTEM FOR SINGLE-LENS REFLEX CAMERAS

BACKGROUND OF THE INVENTION (a) Field of the Invention

The present invention relates to a focusing optical system for single-lens reflex cameras.

(b) Description of the Prior Art

There have conventionally been known some focusing optical systems which are described below:

One of such focusing optical systems comprises a semitransparent mirror 3 arranged on the optical axis and in the vicinity of a focusing glass 2 of a single-lens reflex camera as shown in FIG. 1, whereby a portion of the light emitted from an object to be photographed and having passed through a photographing lens 1 is split and an image of object formed on a detector element 5 is refocused with a auxiliary lens 4. This conventional method has a defect that the semitransparent mirror arranged in the vicinity of the focusing glass forms a dark portion at the center of the view-finder system, thereby hindering observation through the view-finder. There have also been known another focusing optical system for single-lens reflex cameras which comprises a semitransparent mirror 6a at the center of a quick return mirror 6 as shown in FIG. 2, and is so adapted as to deflect a portion of the light having transmitted through said semitransparent mirror downward or two right and left directions with another reflecting mirror 7 and further focus said portion of the light on a detector element 9 with a auxiliary lens 8. The focusing optical system mentioned as this example has defects that it requires numerous component parts which occupy large spaces for their arrangement and that arranging errors for individual parts are totalized, thereby degrading focusing accuracy.

SUMMARY OF THE INVENTION

It is therefore a general object of the present invention to provide a focusing optical system for single-lens reflex cameras comprising a quick return mirror which has a section of incidence formed by removing a portion of its mirror surface and an emerging section, and a detector element which is arranged in the vicinity of said emerging section, said focusing optical system being so adapted in such a manner that the light emitted from an object to be photographed and harring passed through said section of incidence is reflected repeatedly inside said quick return mirror, whereafter said light is allowed to emerge through said emerging section and then is detected with said detector element.

The focusing optical system according to the present invention has such a composition as illustrated in FIG. 3 wherein a portion of mirror surface (12), for example a portion on the optical axis, of the quick return mirror of a single-lens reflex camera is removed such that the light from the photographic lens is allowed to pass inside the parallel plane glass sheets composing said mirror, reflect repeatedly on both the upper and lower surfaces as illustrated, emerge in the vicinity of the end of said mirror and then is detected with the detector element arranged in the vicinity of said mirror end. When the optical path as measured from the transparent section of the mirror through the insides of the glass sheets to the detector element is optically equal to the distance from the photographic lens to the film surface, it is possible to focus the photographic lens by utilizing the light intensity measure with the detector 13.

DESCRIPTION OF THE PREFERRED EMBODIMENTS

Now, the present invention will be described more detailedly with reference to the embodiments illustrated in the accompanying drawings.

Figure 1:
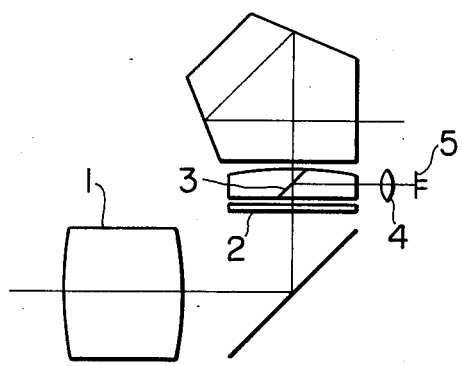
FIG. 1 and FIG. 2 show sectional views illustrating the compositions of the conventional focusing optical systems respectively for single-lens reflex cameras.
Figure 2:
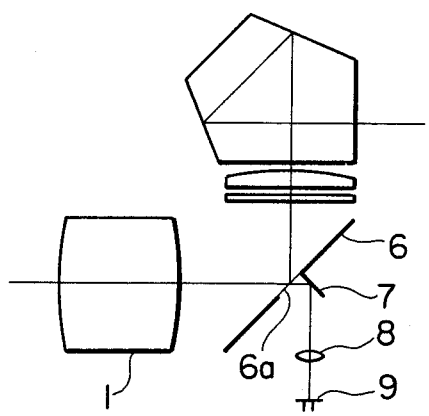
Figure 3:
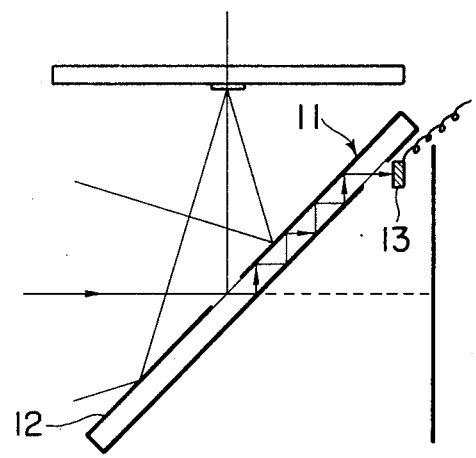
FIG. 3 shows a sectional view illustrating the principle of the focusing optical system according to the present invention.
Figure 4:
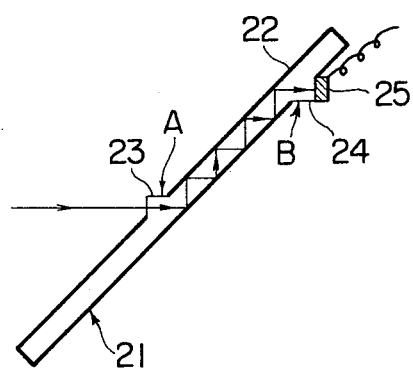
FIG. 4 through FIG. 7 show diagrams illustrating the compositions of various embodiments respectively of the present invention.

FIG. 4 shows a first embodiment of the present invention wherein the reference numeral 21 represents a quick return mirror and a transparent section of incidence A is formed at the center of said quick return mirror by removing its surface (22). The reference numeral 23 designates a prism attached to the section of incidence A and the reference numeral 24 denotes another prism which is attached to an emerging section B formed in the vicinity of the end portion of said mirror. Arranged on one surface of this prism 24 is a detector element represented by a reference numeral 25. In this embodiment, a portion of the light transmitted through the photographic lens is incident on the prism 23, passes through the section of incidence into the inside of the parallel plane glass sheets, reflects on the inner surfaces, emerges through the prism 24 and then is measured with the detector element 25. Though the lower inside of the mirror may be finished as a mirror in this embodiment, it may not be a mirror since incident light can be totally reflected by adequately selecting a refractive index for the glass material of said mirror. In such a case, the film side surface of the mirror will not absorb the light, thereby minimizing loss in light intensity. In this embodiment, it will be possible not to use the prisms 23 and 24 but to form transparent sections of incidence and emergence by removing the mirror surfaces from the section for allowing the light to enter the inside of the parallel glass sheets and that for allowing it to emerge from inside said glass sheets as shown in FIG. 3 illustrating the principle of the present invention. In such a case, however, chromatic aberration will be produced and, in addition, loss of light intensity may be caused due to the inward refraction at the section of incidence.

Figure 5:
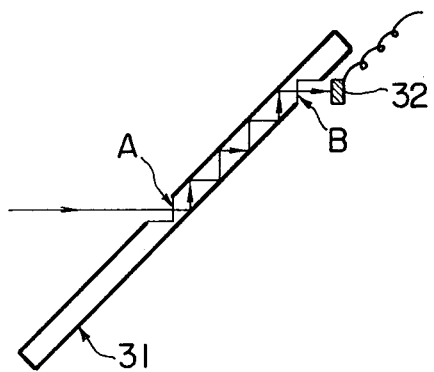

FIG. 5 illustrates a second embodiment of the present invention wherein prism-like notches are formed in the quick return mirror 31 at its central portion and the portion just before the detector element 32 respectively as the section of incidence A and emerging section B. In this embodiment, the light can be incident and emerge also at right angles with regard to the glass surfaces.

Figure 6:
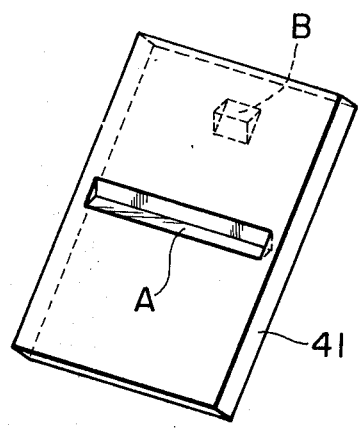

FIG. 6 shows a third embodiment wherein the section of incidence A of the quick return mirror 41 is not limited in the vicinity of the optical axis but is elongated in the direction parallel to the rotating axis of said mirror. The emerging section is formed in the vicinity of the position at which the light is focused by the focusing function of the photographic lens so that the light is focused on a detector element arranged in the vicinity of the emerging section. This embodiment makes it possible to collect the light to enter the inside of the parallel glass sheets in a wider range.

Figure 7:
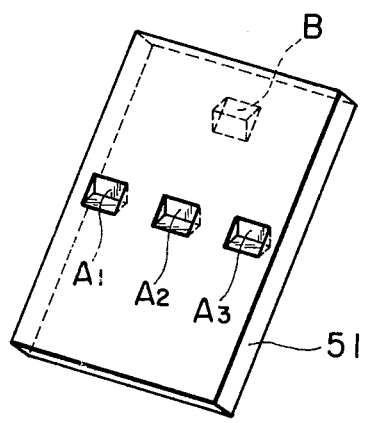

FIG. 7 shows a fourth embodiment of the present invention wherein plural sections of incidence $A_1, A_2, \ldots$ are formed along a straight line parallel to the rotating axis of the quick return mirror 51. This optical system permits using rays within a wide range for detecting to focus a photographic lens by focusing the rays incident on these sections of incidence $A_1, A_2, \ldots$ on the emerging section B and leading the rays to a detector element arranged in the vicinity of said emerging section B in the manner similar to that in the embodiment illustrated in FIG. 6. In the embodiments described above, the detector element may be kept in direct contact with the mirror as shown in FIG. 4 or apart from the mirror as illustrated in FIG. 5. When the detector element is kept in direct contact with the mirror, it is needless to say that the detector element moves together with said mirror. When the detector element is arranged apart from the mirror, it should be made movable with the mirror so that it will not hinder photographing. In the embodiment illustrated in FIG. 6, it is possible to focus an object to be photographed on an eccentric portion of a film by displacing the emerging section B along a straight line parallel to the rotating axis of the mirror. Similarly, it is possible to focus an object to photographed on an optional portion on a film by adequately combining various positions of the sections of incidence and emerging sections.

As is understood from the foregoing descriptions, the focusing optical system according to the present invention can be composed almost inside the quick return mirror with few additional component parts and assure high focusing accuracy since the light passes only within the mirror until it reaches the detector element for focusing the photographic lens. Further, the focusing optical system according to the present invention makes it possible to collect rays within a wide range and lead them to a detector element by adequately arranging the sections of incidence formed in the quick return mirror. Furthermore, said focusing optical system permits preventing chromatic aberration and reducing loss in light intensity by forming prism-like protrusions or notches as the section of incidence and emerging section respectively of the mirror.

Moreover, the mirror can be formed in optional shapes by molding synthetic resin materials though the focusing optical system according to the present invention requires a mirror of rather complicated shape for forming prism-like sections which may be numerous as illustrated in FIG. 7.

We claim:

1. A focusing optical system for single-lens reflex camera comprising a photographic lens, a quick return mirror which is arranged for leading the light having passed through said photographing lens to a finder optical system and which has a section of incidence formed by removing a portion of the surface of said mirror, and an emerging section, and a detector element arranged in the vicinity of said emerging section, and said focusing optical system being adapted in such a manner that the surface of incidence of said section of incidence is arranged perpendicularly to the optical axis of the incident light, that the emerging surface of said emerging section is arranged perpendicularly to the emerging light, and that the light emitted from an object to be photographed and transmitted through said photographic lens is allowed to pass through said section of incidence into said quick return mirror, reflect repeatedly on the inside surfaces of said mirror, emerge from said emerging section and then fall on said detector element.

2. A focusing optical system for single-lens reflex cameras according to claim 1 wherein a prism is arranged at the section of incidence of said quick return mirror in such a direction that a surface of said prism is vertical to the optical axis.

3. A focusing optical system for single-lens reflex cameras according to claim 1 wherein a prism is arranged at the emerging section of said quick return mirror in such a direction that a surface of said prism is vertical to the optical axis of the emerging light.

4. A focusing optical system for single-lens reflex camera according to claim 1 wherein a notch is formed at the section of incidence of said quick return mirror in such a direction that a surface of said notch is vertical to the optical axis.

5. A focusing optical system for single-lens reflex cameras according to claim 1 wherein a notch is formed at the emerging section of said quick return mirror in such a direction that a surface of said notch is vertical to the optical axis of the emerging light.

6. A focusing optical system for single-lens reflex camera according to claim 1 wherein the section of incidence of said quick return mirror is arranged in the vicinity of the optical axis of said photographic lens.

7. A focusing optical system for single-lens reflex cameras according to claim 1 wherein the section of incidence of said quick return mirror has a shape elongated along a straight line in parallel to the rotating axis of said quick return mirror.

8. A focusing optical system for single-lens reflex cameras according to claim 1 wherein plural number of sections of incidence of said quick return mirror are arranged along a straight line in parallel to the rotating axis of said quick return mirror.

9. A focusing optical system for single-lens reflex cameras according to claim 1 wherein the emerging section of said quick return mirror is arranged on a straight line in parallel to the rotating axis of said quick return mirror.

* * * * *